US011219090B2

(12) United States Patent
Yang

(10) Patent No.: US 11,219,090 B2
(45) Date of Patent: Jan. 4, 2022

(54) METHOD AND DEVICE FOR PROCESSING DATA

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/624,418

(22) PCT Filed: Jul. 21, 2017

(86) PCT No.: PCT/CN2017/093834
§ 371 (c)(1),
(2) Date: Dec. 19, 2019

(87) PCT Pub. No.: WO2019/014916
PCT Pub. Date: Jan. 24, 2019

(65) Prior Publication Data
US 2020/0229269 A1    Jul. 16, 2020

(51) Int. Cl.
*H04W 80/02*    (2009.01)
*H04W 80/08*    (2009.01)
*H04W 28/02*    (2009.01)

(52) U.S. Cl.
CPC ....... *H04W 80/02* (2013.01); *H04W 28/0278* (2013.01); *H04W 80/08* (2013.01)

(58) Field of Classification Search
CPC .................................................... H04W 4/00
See application file for complete search history.

(56) References Cited

U.S. PATENT DOCUMENTS

| 2009/0103478 A1* | 4/2009 | Sammour ............. | H04L 69/324 370/328 |
| 2011/0188377 A1* | 8/2011 | Kim .................... | H04L 49/9021 370/235 |

(Continued)

FOREIGN PATENT DOCUMENTS

| CN | 201509209 U | 6/2010 |
| CN | 103858372 A | 6/2014 |

(Continued)

OTHER PUBLICATIONS

English Translation of First Russian Office Action dated Jul. 21, 2017 for Application No. 2019139763/07 (078219).

(Continued)

*Primary Examiner* — San Htun
(74) *Attorney, Agent, or Firm* — Young Basile Hanlon & MacFarlane, P.C.

(57) ABSTRACT

A method and device for processing data are provided. The method comprises: a terminal device controlling the current state of a copied data transfer function according to first indication information, wherein the first indication information is used for indicating whether the copied data transfer function is enabled; and the terminal device processing, according to the current state of the copy data transfer function, each RLC service data unit (SDU) in a first radio link control (RLC) cache and a second RLC cache, wherein the first RLC cache corresponds to a first RLC entity, and the second RLC cache corresponds to a second RLC entity.

8 Claims, 4 Drawing Sheets

(56) References Cited

U.S. PATENT DOCUMENTS

| | | | |
|---|---|---|---|
| 2014/0341013 A1 | 11/2014 | Kumar et al. | |
| 2016/0286412 A1 | 9/2016 | Kim et al. | |
| 2017/0041767 A1* | 2/2017 | Vajapeyam | ............ H04W 4/06 |
| 2019/0098640 A1* | 3/2019 | Holakouei | ........ H04W 28/0236 |

FOREIGN PATENT DOCUMENTS

| | | |
|---|---|---|
| CN | 103858455 A | 6/2014 |
| CN | 105659690 A | 6/2016 |
| CN | 106416403 A | 2/2017 |
| JP | 2020515182 A | 5/2020 |
| RU | 2421910 C2 | 6/2011 |

OTHER PUBLICATIONS

3GPP TSG RAN WG2 AH; Qingdao, China, Jun. 27-29, 2017; R2-1707249.
3GPP TSG-RAN WG2 Ad-hoc NR#2; Qingdao, China, Jun. 27-29, 2017; R2-1707368.
3GPP TSG-RAN WG2 Meeting NR Ad-hoc #2; Quingdao, China Jun. 27-29, 2017; R2-1706945; (Revision of R2-1705416).
3GPP TSG-RAN WG2 #98-AH; Qingdao, P.R. of China, Jun. 27-29, 2017; Tdoc R2-1707153.
3GPP TSG-RAN WG2 NR Ad Hoc; Qingdao, China, Jun. 27-29, 2017; R2-1707076.
3GPP TSG RAN WG2 Meeting #98; Hangzhou, China, May 15-19, 2017; R2-1704836.
European Search Report for Application No. 17918173.0 dated May 26, 2020.
Chile Examination Report with English Translation for CL Application 201903746 dated Mar. 17, 2021. (17 pages).
Canada Examination Report for CA Application 3064974 dated Mar. 3, 2021. (4 pages).
European Examination Report for EP Application 17918173.0 dated Jan. 26, 2021. (9 pages).
India First Examination Report for IN Application 201917054443 dated Mar. 24, 2021. (7 pages).
Japanese Office Action with English Translation for JP Application 2020-500897 dated Jun. 18, 2021. (8 pages).
Chinese First Office Action with English Translation for CN Application 202010068743.8 dated Apr. 20, 2021. (22 pages).
Huawei, HiSilicon, PDCP operation for packet duplication, 3GPP TSG-RAN WG2 NR Ad Hoc, R2-1706483, Jun. 27-29, 2017. (4 pages).
Chile Office Action with English Translation for CL Application 2019003746 dated Aug. 9, 2021. (18 pages).
Communication pursuant to Article 94(3) EPC for EP Application 17918173.0 dated Aug. 9, 2021. (7 pages).
Singapore Invitation to Respond to Written Opinion for SG Application 11201911247V dated Jul. 19, 2021. (6 pages).
Korean Office Action with English Translation for KR Application 1020207000711 dated Oct. 29, 2021. (9 pages).

\* cited by examiner

METHOD AND DEVICE FOR PROCESSING DATA

CROSS-REFERENCE TO RELATED APPLICATION(S)

This application is a 371 application of International Application No. PCT/CN2017/093834, filed on Jul. 21, 2017, the entire disclosure of which is hereby incorporated by reference.

TECHNICAL FIELD

Implementations of the present disclosure relate to the communication field, and more particularly, to a method and a device for processing data.

BACKGROUND

In a carrier aggregation scenario, a Packet Data Convergence Protocol (PDCP) layer may support a data duplication function to improve the reliability of data transmission, i.e. a PDCP entity may duplicate a PDCP Protocol Data Unit (PDU) into two (or more) copies which are respectively sent to two Radio Link Control (RLC) entities (or more RLC entities). After receiving data sent by the PDCP entity, the RLC entity will first store the data in an RLC buffer and wait for transmission of the data to a network device.

Therefore, for a terminal device, any implementation for processing data in an RLC buffer is an urgent problem to be solved.

SUMMARY

The implementations of the present disclosure provide a method and a device for processing data.

In a first aspect, there is provided a method for processing data, including: controlling, by a terminal device, a current state of data duplication and transmission function according to first indication information, wherein the first indication information is used for indicating whether the data duplication and transmission function is enabled; and processing, by the terminal device, each RLC service data unit (SDU) in a first radio link control (RLC) buffer and a second RLC buffer according to the current state of the data duplication and transmission function, wherein the first RLC buffer corresponds to a first RLC entity and the second RLC buffer corresponds to a second RLC entity.

In the implementation of the present disclosure, the first indication information may be used for indicating whether the data duplication and transmission function is enabled, and may also be used for indicating disabling or stopping the data duplication and transmission function of a RLC entity. The terminal device may transmit different data through different RLC entities in a case that the first indication information is used for indicating disabling the data duplication and transmission function, or the terminal device may transmit data through another RLC entity of which the data duplication and transmission function has not been stopped in a case that the first indication information is used for indicating stopping data duplication and transmission function of a RLC entity.

In combination with the first aspect, in one possible implementation of the first aspect, the processing, by the terminal device, the each RLC service data unit (SDU) in the first radio link control (RLC) buffer and the second RLC buffer according to the current state of the data duplication and transmission function, includes: controlling, by the terminal device, a state of a timer corresponding to each RLC SDU in the first RLC buffer and the second RLC buffer according to the current state of the data duplication and transmission function, and the timer corresponding to the each RLC SDU is used for controlling time that the each RLC SDU occupies an RLC buffer; and processing, by the terminal device, the each RLC SDU according to the state of the timer corresponding to the each RLC SDU.

In combination with the first aspect, in one possible implementation of the first aspect, the timer corresponding to the each RLC SDU has the same time length.

In combination with the first aspect, in one possible implementation of the first aspect, timers corresponding to at least two RLC SDUs have different time lengths.

In combination with the first aspect, in one possible implementation of the first aspect, the controlling, by the terminal device, the state of the timer corresponding to the each RLC SDU in the first RLC buffer and the second RLC buffer according to the current state of the data duplication and transmission function, includes: if the data duplication and transmission function is in an on state, starting the timer corresponding to the each RLC SDU in the first RLC buffer and the second RLC buffer; or if the data duplication and transmission function is in an off state, stopping the timer corresponding to the each RLC SDU in the first RLC buffer and the second RLC buffer, or stopping a timer corresponding to each RLC SDU in the second RLC buffer and keeping on a timer corresponding to each RLC SDU in the first RLC buffer.

In other words, when the data duplication and transmission function is in an on state, the terminal device may control to start a timer corresponding to each RLC SDU in each RLC buffer, or, in other words, duplicated data is transmitted through which RLC entities, timers corresponding to RLC SDUs in RLC buffers corresponding to which RLC entities may be started, and time that each RLC SDU occupies an RLC buffer is controlled through a timer corresponding to each RLC SDU.

For example, the terminal device may control to close a timer corresponding to each RLC SDU in the first RLC buffer and the second RLC buffer, i.e. no longer control time that an RLC SDU in each RLC buffer occupies a buffer, so that the RLC SDU in the RLC buffer will be cleared from the RLC buffer only when the RLC SDU in the RLC buffer is successfully transmitted.

In combination with the first aspect, in one possible implementation of the first aspect, the first RLC buffer includes a first RLC SDU, the first RLC SDU corresponds to a first timer, and the processing, by the terminal device, the each RLC SDU according to the state of the timer corresponding to the each RLC SDU, includes: before the first timer expires, submitting, by the terminal device, a first RLC PDU to a media access control (MAC) entity if the first RLC SDU has generated the first RLC PDU; or in a case that the first timer expires, discarding, by the terminal device, the first RLC SDU if the first RLC SDU does not generate the first RLC PDU.

In combination with the first aspect, in some implementations of the first aspect, the method further includes: in a case that the first timer expires, resetting, by the terminal device, the first timer if the first RLC SDU does not generate the first RLC PDU; or before the first timer expires, stopping, by the terminal device, the first timer if the first RLC SDU has generated the first RLC PDU.

Therefore, in the method for processing data of the implementation of the present disclosure, the terminal device starts a timer for each RLC SDU in an RLC buffer, controls time that each RLC SDU occupies the RLC buffer through a timer corresponding to the each RLC SDU, and in a case that a timer expires, a corresponding RLC SDU is discarded if the RLC SDU does not generate an RLC PDU, or before the timer expires, if a corresponding RLC SDU has generated an RLC PDU, the timer is stopped, and the generated RLC PDU is submitted to a MAC entity. Further, the RLC PDU may be transmitted to a network device through a physical carrier.

In combination with the first aspect, in one possible implementation of the first aspect, the processing, by the terminal device, the each RLC service data unit (SDU) in the first radio link control (RLC) buffer and the second RLC buffer according to the current state of the data duplication and transmission function, includes: in a case that the data duplication and transmission function of the second RLC entity is in an off state, discarding each RLC SDU in the second RLC buffer.

It should be noted that the second RLC buffer is an RLC buffer corresponding to the second RLC entity whose data duplication and transmission function is stopped, and optionally, the terminal device may stop the data duplication and transmission function of the second RLC entity, that is, stop using the second RLC entity to transmit data, in a case that a channel situation of a physical carrier corresponding to the second RLC entity is poor. When the data duplication and transmission function of the second RLC entity is closed by the terminal device, the terminal device may discard each RLC SDU in the second RLC buffer, thereby being beneficial to avoiding occupation of the second RLC buffer by this part of RLC SDU.

In combination with the first aspect, in one possible implementation of the first aspect, the second RLC buffer includes a second RLC SDU, the second RLC SDU corresponds to a second timer, and the processing, by the terminal device, the each RLC service data unit (SDU) in the first radio link control (RLC) buffer and the second RLC buffer according to the current state of the data duplication and transmission function, includes: before the data duplication and transmission function of the second RLC entity is in an off state, transmitting, by the terminal device, the second RLC PDU to the network device or discarding the second RLC PDU if the second RLC SDU has generated a second RLC PDU.

That is, if the second RLC SDU in the second RLC buffer has generated a second RLC PDU before the second RLC entity is stopped from transmitting data, the terminal device may choose to continue transmitting the second RLC PDU to a network device or may discard the second RLC PDU.

In combination with the first aspect, in one possible implementation of the first aspect, the transmitting, by the terminal device, the second RLC PDU to the network device or discarding the second RLC PDU, includes: in a case that the network device has successfully received duplicated data of the second RLC SDU in the first RLC buffer, discarding, by the terminal device, the second RLC PDU; or in a case that the network device does not successfully receive duplicated data of the second RLC SDU in the first RLC buffer, transmitting, by the terminal device, the second RLC PDU to the network device.

In other words, the terminal device may discard the second RLC PDU in a case that the network device has successfully received the duplicated data of the second RLC SDU in the first RLC buffer, that is, the duplicated data of the second RLC SDU is successfully transmitted, thereby avoiding waste of resources caused by repeated transmission of the second RLC PDU. Or, in a case that the network device fails to receive the duplicated data of the second RLC SDU in the first RLC buffer, that is, the duplicated data of the second RLC SDU fails to be transmitted, the second RLC PDU is transmitted to the network device.

In combination with the first aspect, in one possible implementation of the first aspect, the controlling, by the terminal device, the current state of the data duplication and transmission function according to the first indication information, includes: controlling, by the terminal device, to start the data duplication and transmission function if the first indication information indicates enabling the data duplication and transmission function; or controlling, by the terminal device, to close the data duplication and transmission function if the first indication information indicates disabling the data duplication and transmission function.

In combination with the first aspect, in some implementations of the first aspect, the method further includes: receiving, by the terminal device, a MAC control element (CE) sent by a network device, wherein the MAC CE includes the first indication information.

In combination with the first aspect, in one possible implementation of the first aspect, the first indication information is specifically used for indicating stopping data duplication and transmission function of the second RLC entity.

In combination with the first aspect, in some implementations of the first aspect, the method further includes: if the data duplication and transmission function is in an on state, duplicating, by a packet data convergence protocol (PDCP) entity of the terminal device, a PDCP packet data unit (PDU) to be transmitted into two units and submitting the two units to the first RLC entity and the second RLC entity respectively; or submitting, by the PDCP entity of the terminal device, the PDCP PDU to be transmitted to the first RLC entity if the data duplication and transmission function is in an off state; or submitting, by the PDCP entity of the terminal device, a first PDCP PDU to be transmitted to the first RLC entity and submitting a second PDCP PDU to be transmitted to the second RLC entity if the data duplication and transmission function is in an off state, wherein the first PDCP PDU and the second PDCP PDU are different.

In a second aspect, a device for processing data is provided. The device is used for implementing the method in the first aspect or in any possible implementation of the first aspect. Specifically, the device includes units for performing the method in the first aspect or in any one of the possible implementations of the first aspect.

In a third aspect, a device for processing data is provided, and the device includes a memory, a processor, an input interface, and an output interface. The memory, the processor, the input interface and the output interface are connected through a bus system. The memory is used for storing instructions, and the processor is used for executing the instructions stored in the memory for executing the method of the first aspect or any one of the possible implementations of the first aspect.

In a fourth aspect, a computer storage medium is provided for storing computer software instructions for executing the method of the first aspect or any possible implementation of the first aspect, and the computer software instructions include programs designed for executing the aspects.

In a fifth aspect, a computer program product containing instructions is provided, when the instructions are run on a computer, the computer is caused to perform the method of the first aspect or any one of optional implementations of the first aspect.

DETAILED DESCRIPTION

In the following, technical schemes in the implementations of the present disclosure will be described with reference to the drawings in the implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

It should be understood that the technical solutions of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a New Radio (NR) System or a future 5G system.

A terminal device in the implementations of the present disclosure may be referred to a user equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. An access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an on-board device, a wearable device, a terminal device in a future 5G network, or a terminal device in a future evolved Public Land Mobile Network (PLMN), etc., which is not limited in the implementations of the present disclosure.

A network device in the implementations of the present disclosure may be a device for communicating with a terminal device, and the network device may be a Base Transceiver station (BTS) in GSM or CDMA, a NodeB (NB) in a WCDMA system, an evolutional NodeB (eNB or eNodeB) in an LTE system, or a wireless controller in a scenario of a Cloud Radio Access Network (CRAN), or the network device may be a relay station, an access point, an on-board device, a wearable device, a network device in a future 5G network, or a network device in a future evolved Public Land Mobile Network (PLMN), etc., which is not limited in the implementations of the present disclosure.

Figure 1:
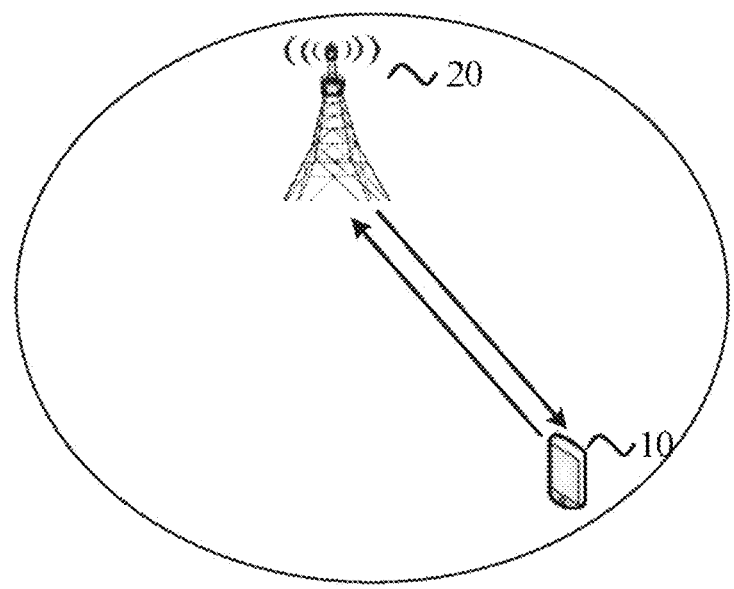
FIG. 1 shows a schematic diagram of an application scenario according to an implementation of the present disclosure.

FIG. 1 is a schematic diagram of an application scenario according to an implementation of the present disclosure. A communication system in FIG. 1 may include a terminal device 10 and a network device 20. The network device 20 is used for providing communication services for the terminal device 10 and access to a core network. The terminal device 10 accesses the network by searching for a synchronization signal, or a broadcast signal, etc., transmitted by the network device 20 to communicate with the network. Arrows shown in FIG. 1 may represent uplink/downlink transmission through cellular links between the terminal device 10 and the network device 20.

In a carrier aggregation scenario, a PDCP may support the data duplication and transmission function, i.e. use data duplication and transmission function of the PDCP to make duplicated data correspond to two or more logical channels, and finally ensure that duplicated multiple identical PDCP PDUs can be transmitted on different physical layer aggregated carriers, thus achieving a frequency diversity gain to improve the reliability of data transmission.

Figure 2:
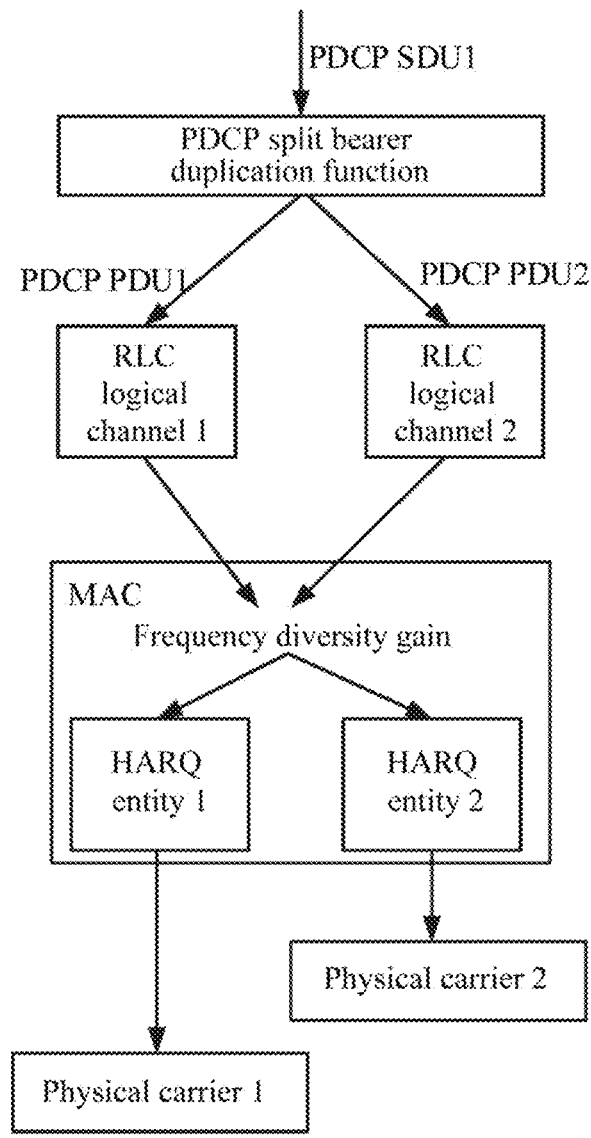
FIG. 2 shows a protocol architecture diagram of transmission for duplicated data in a carrier aggregation scenario.

For ease of understanding, how to schedule duplicated data on different physical carriers will be briefly described below with reference to FIG. 2. As shown in FIG. 2, a PDCP layer has a split bearer duplication function, which duplicates and encapsulates data of PDCP SDU1 into PDCP PDU1 and PDCP PDU2. The PDCP PDU1 and the PDCP PDU2 have the same contents, i.e., carried payloads and headers are the same. The PDCP PDU1 and the PDCP PDU2 are mapped to different RLC entities respectively. The RLC entities place the PDCP PDU1 and the PDCP PDU2 on different logical channels (logical channel 1 and logical channel 2). For MAC, after knowing which logical channels transmit duplicated data of the same PDCP PDU, these duplicated data are transmitted on different carriers through different Hybrid Automatic Repeat reQuest (HARQ) entities. For example, duplicated data carried in logical channel 1 is transmitted on physical carrier 1 through HARQ entity 1, duplicated data carried in logical channel 2 is transmitted on physical carrier 2 through HARQ entity 2.

Data received by an RLC entity from a PDCP layer or data sent to a PDCP layer is called an RLC SDU or a PDCP PDU. Data received by an RLC entity from a MAC layer or data sent to a MAC layer is called an RLC PDU or a MAC SDU.

For a carrier aggregation scenario, a network device may enable or disable data duplication and transmission function of a terminal device, i.e. a PDCP entity may transmit the same data through different RLC entities or different data through different RLC entities. After receiving an RLC SDU transmitted by a PDCP layer, an RLC entity will store the RLC SDU in an RLC buffer and wait for transmission to the network device. Therefore, there is a need for a method for processing data that may realize processing of an RLC SDU in an RLC buffer.

Figure 3:
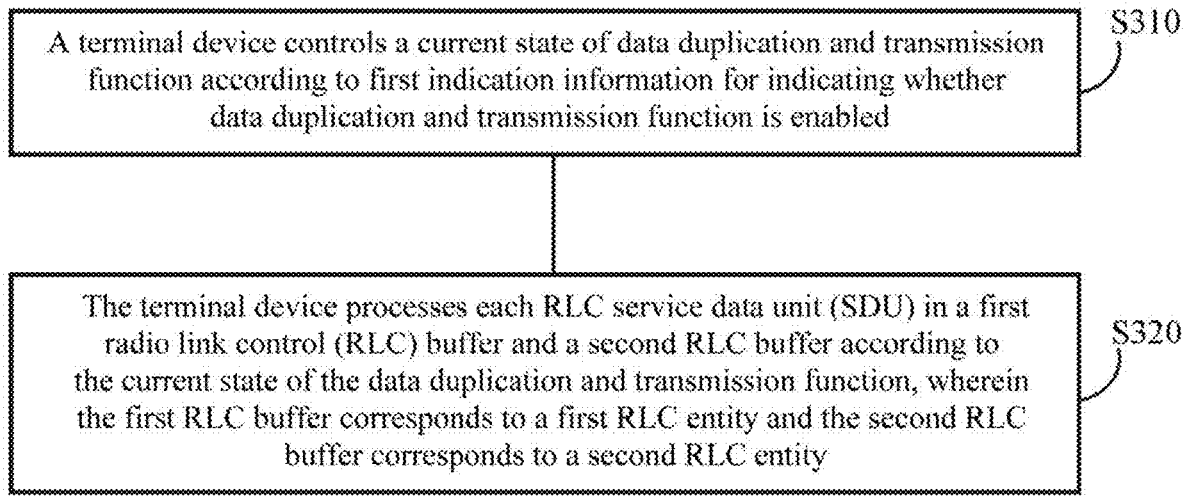
FIG. 3 is a schematic flowchart of a method for processing data according to an implementation of the present disclosure.

FIG. 3 shows a schematic block diagram of a method 300 of processing data according to an implementation of the present disclosure. As shown in FIG. 3, the method 300 includes acts S310 and S320.

In S310: a terminal device controls a current state of data duplication and transmission function according to first indication information for indicating whether data duplication and transmission function is enabled.

In the implementation of the present disclosure, the first indication information may be used for indicating whether the data duplication and transmission function is enabled or not, and may also be used for indicating disabling or stopping data duplication and transmission function of a RLC entity. In a case where the first indication information is used for indicating disabling the data duplication and transmission function, the terminal device may transmit different data through different RLC entities, or in a case where the first indication information is used for indicating stopping the data duplication and transmission function of a RLC entity, the terminal device may transmit data through another RLC entity of which the data duplication and transmission function has not been stopped.

By way of example and not limitation, the terminal device may include a first RLC entity and a second RCL entity, each RLC entity corresponding to a corresponding RLC buffer. When data duplication and transmission function is started, the terminal device may duplicate a PDCP PDU to be transmitted into two PDCP PDUs, and submit them to the first RLC entity and the second RLC entity respectively, and transmit the same PDCP PDU through the first RLC entity and the second RLC entity.

When the data duplication and transmission function is closed, the terminal device may transmit different PDCP PDUs through the first RLC entity and the second RLC entity, or if a data duplication function of the second RLC entity is stopped, the terminal device may transmit a PDCP PDU only through the first RLC entity and does not transmit data through the second RLC entity.

Optionally, in one specific implementation, S310 may include: if the first indication information indicates enabling the data duplication and transmission function, the terminal device controls to start the data duplication and transmission function; or if the first indication information indicates disabling the data duplication and transmission function, the terminal device controls to close the data duplication and transmission function.

The terminal device may use different RLC entities to transmit the same data when the data duplication and transmission function is started, and may transmit different data through different RLC entities or transmit data through only one RLC entity when the data duplication and transmission function is closed.

Optionally, the method 300 further includes: the terminal device receives a MAC control element (CE) sent by a network device, wherein the MAC CE includes the first indication information.

In other words, the network device may control the terminal device to enable or disable the data duplication and transmission function through a dynamic signaling such as a MAC CE, or the network device may control the terminal device to enable or disable the data duplication and transmission function through another signaling. A notification manner of the first indication information in the implementation of the present disclosure is not particularly limited.

In S320, the terminal device processes each RLC service data unit (SDU) in a first radio link control (RLC) buffer and a second RLC buffer according to the current state of the data duplication and transmission function, wherein the first RLC buffer corresponds to a first RLC entity and the second RLC buffer corresponds to a second RLC entity.

Specifically, the terminal device may determine whether to discard an RLC SDU in an RLC buffer or keep the RLC SDU continuing to use the RLC buffer, i.e. not to discard the RLC SDU in the RLC buffer, according to whether the data duplication and transmission function is currently in an on state or an off state.

For example, if the terminal device transmits duplicated data through the first RLC entity and the second RLC entity, in other words, the first RLC entity and the second RLC entity transmit the same data, then when the data duplication and transmission function is closed, the terminal device may discard an RLC SDU in an RLC buffer corresponding to one of the RLC entities. For example, if a channel condition of physical carrier 1 corresponding to the first RLC entity is better than a channel condition of physical carrier 2 corresponding to the second RLC entity, the terminal device may consider that an RLC SDU in the first RLC buffer corresponding to the first RLC entity may be transmitted to the network device faster through the physical carrier 1, that is, the time that the RLC SDU in the first RLC buffer occupies the first RLC buffer is relatively less. Therefore, the terminal device may discard an RLC SDU in the second RLC buffer, i.e., discard a copy of the duplicated data, thereby being beneficial to avoiding a problem that the second RLC buffer is occupied for a long time because the RLC SDU in the second RLC buffer cannot be transmitted to the network device in time due to a poor channel condition of the physical carrier 2.

That is, when the data duplication and transmission function is closed, if the first RLC entity and the second RLC entity are used for transmitting duplicated data, duplicated data in an RLC buffer corresponding to one of the RLC entities may be discarded, or if data duplication and transmission function of one RLC entity of the RLC entities is stopped when the data duplication and transmission function is closed, duplicated data in an RLC buffer corresponding to the one RLC entity may be discarded.

Optionally, in some implementations, S320 may include: the terminal device controls a state of a timer corresponding to each RLC SDU in the first RLC buffer and the second RLC buffer according to the current state of the data duplication and transmission function, and the timer corresponding to the each RLC SDU is used for controlling time that the each RLC SDU occupies an RLC buffer; the terminal device processes the each RLC SDU according to the state of the timer corresponding to the each RLC SDU.

In the implementation of the present disclosure, the terminal device may assign a timer to each RLC SDU, the timer corresponding to the each RLC SDU is used for controlling time that the each RLC SDU occupies an RLC buffer, or the maximum time length that the each RLC SDU occupies an RLC buffer is a time length of the timer. The terminal device assigns a timer to each RLC SDU, therefore, the timer may be used for controlling time that the corresponding RLC SDU occupies an RLC buffer, which is beneficial to avoiding a problem of RLC buffer leakage caused by an RLC SDU occupying an RLC buffer for a long time, and is also beneficial to improving a utilization rate of the RLC buffer.

Optionally, a time length of a timer corresponding to each RLC SDU may be the same or different, and the implementation of the present disclosure is not particularly limited thereto.

Specifically, the terminal device may determine whether to turn on or off a timer corresponding to each RLC SDU according to the state of the data duplication and transmission function, and then process each RLC SDU according to a state of the timer corresponding to the each RLC SDU. For example, if RLC SDU 1 has added an RLC header to generate the RLC PDU 1 before a timer expires, the terminal device may discard the RLC SDU 1 in an RLC buffer (this case may correspond to a UM mode, i.e. no feedback from the network device is required), or may not discard the RLC SDU 1 temporarily, and discard the RLC SDU 1 after receiving feedback information from the network device (this case may correspond to an AM mode, i.e. feedback from the network device is required). The feedback information is used for indicating that the network device has received the RLC PDU 1, so original data of the RLC PDU 1, i.e. RLC SDU 1, may be discarded.

For another example, when the timer expires, if the RLC SDU 1 has not yet generated the RLC PDU 1, that is, the RLC SDU 1 has not been transmitted to the network device (which may be caused by a poor channel condition of a physical carrier corresponding to an RLC entity), the RLC SDU 1 may be discarded in order to avoid the problem of RLC buffer leakage caused by the RLC SDU 1 occupying an RLC buffer for a long time.

Optionally, as an implementation, the terminal device controls the state of the timer corresponding to the each RLC SDU in the first RLC buffer and the second RLC buffer according to the current state of the data duplication and transmission function, including: if the data duplication and transmission function is in an on state, the timer corresponding to the each RLC SDU in the first RLC buffer and the second RLC buffer is started; or if the data duplication and transmission function is in an off state, the timer corresponding to the each RLC SDU in the first RLC buffer and the second RLC buffer is stopped, or a timer corresponding to each RLC SDU in the second RLC buffer is stopped, and a timer corresponding to each RLC SDU in the first RLC buffer is kept on.

In other words, when the data duplication and transmission function is in an on state, the terminal device may control to start a timer corresponding to each RLC SDU in each RLC buffer, or, in other words, duplicated data is transmitted through which RLC entities, timers corresponding to RLC SDUs in RLC buffers corresponding to which RLC entities may be started, and time that each RLC SDU occupies an RLC buffer is controlled through a timer corresponding to each RLC SDU, thereby being beneficial to avoiding a problem of buffer leakage caused by an RLC SDU occupying an RLC buffer for a long time.

When the data duplication and transmission function is in an off state, in this case, different RLC entities transmit different data, and the reliability of data transmission is reduced compared with a manner of transmission of duplicated data. Therefore, the terminal device may control to close a timer corresponding to each RLC SDU in the first RLC buffer and the second RLC buffer, i.e. no longer control time that an RLC SDU in each RLC buffer occupies a buffer, or the RLC SDU will occupy an RLC buffer until the RLC SDU is successfully transmitted to the network device. Since the reliability of data transmission cannot be guaranteed by the data duplication and transmission function when the data duplication and transmission function is in an off state, the reliability of data transmission may be improved by sacrificing time occupying a buffer.

Therefore, in the method for processing data according to the implementation of the present disclosure, when the data duplication and transmission function is started, the reliability of data transmission may be improved through the data duplication and transmission function, so that the terminal device may control time that an RLC SDU occupies a buffer, thereby improving a utilization rate of an RLC buffer. When the data duplication and transmission function is closed, the reliability of data transmission cannot be guaranteed through the data duplication and transmission function, in this case, the reliability of data transmission may be improved by sacrificing time occupying a buffer, that is, the method for processing data of the implementation of the present disclosure may improve comprehensive performance of the reliability of data transmission and the utilization rate of the buffer.

Optionally, if the duplicated data function of the second RLC entity is in an off state, that is, the second RLC entity is not used for data transmission, in this case, the terminal device may only close a timer corresponding to each RLC SDU in the second RLC buffer and keep a timer corresponding to each RLC SDU in the first RLC buffer on.

Optionally, in one possible implementation, the first RLC buffer includes a first RLC SDU, the first RLC SDU corresponds to a first timer, and the terminal device processes each RLC SDU according to the state of the timer corresponding to each RLC SDU, including: before the first timer expires, if the first RLC SDU has generated a first RLC PDU, the terminal device submits the first RLC PDU to a media access control (MAC) entity; or in a case that the first timer expires, if the first RLC SDU does not generate the first RLC PDU, the terminal device discards the first RLC SDU.

Specifically, the first RLC PDU is generated by the first RLC SDU by adding an RLC header. After the first RLC SDU generates the first RLC PDU, the first RLC entity may submit the first RLC PDU to a MAC entity, and further, the first RLC PDU may be transmitted to a network device by a physical carrier corresponding to the first RLC entity.

That is, the generation of the first RLC PDU by the first RLC SDU may be considered that the first RLC SDU may be transmitted to the network device, i.e., the first RLC SDU may not occupy the first RLC buffer, and therefore, the first timer corresponding to the first RLC SDU may be stopped. At the same time, the terminal device may directly discard the first RLC SDU, or may discard the first RLC SDU after receiving feedback information sent by the network device, the feedback information being used for indicating that the network device has successfully received the first RLC PDU, that is, the first RLC SDU has been successfully transmitted to the network device, so the first RLC SDU may be discarded to prevent the first RLC SDU from continuing to occupy an RLC buffer.

It should be understood that the terminal device may stop the first timer in a case that the first RLC SDU generates the first RLC PDU, or may stop the first timer after receiving feedback information sent by the network device. A condition of stopping the first timer may be adjusted under a condition of ensuring reliability of data transmission and a utilization rate of an RLC buffer, and the implementation of the present disclosure is not particularly limited thereto.

Or, in a case that the first timer expires, if the first RLC SDU does not generate the first RLC PDU, it may be considered that the first RLC SDU cannot be transmitted to the network device. In this case, time that the first RLC SDU occupies a buffer reaches a time length of the first timer. In order to avoid the problem of buffer leakage caused by the first RLC SDU occupying an RLC buffer for a long time, the terminal device may discard the first RLC SDU so that another RLC SDU may use the first RLC buffer to improve a utilization rate of the RLC buffer.

Therefore, in the method for processing data of the implementation of the present disclosure, the terminal device starts a timer for each RLC SDU in an RLC buffer, controls time that each RLC SDU occupies the RLC buffer through a timer corresponding to the each RLC SDU, and in a case that a timer expires, a corresponding RLC SDU is discarded if the RLC SDU does not generate an RLC PDU, or before the timer expires, if the RLC SDU has generated an RLC PDU, the timer is stopped and the RLC PDU is submitted to a MAC entity. Further, the RLC PDU may be transmitted to a network device through a physical carrier.

Optionally, in some implementations, S320 may include: in a case that the data duplication and transmission function of the second RLC entity is in an off state, each RLC SDU in the second RLC buffer is discarded.

The second RLC buffer is an RLC buffer corresponding to the second RLC entity whose data duplication and transmission function is stopped, and optionally, the terminal device may stop the data duplication and transmission function of the second RLC entity, that is, stop using the second RLC entity to transmit data, in a case that a channel situation of a physical carrier corresponding to the second RLC entity is poor. When the data duplication and transmission function of the second RLC entity is closed by the terminal device, the terminal device may discard each RLC SDU in the second RLC buffer, thereby being beneficial to avoiding occupation of the second RLC buffer by this part of RLC SDU.

Optionally, in some implementations, the second RLC buffer includes a second RLC SDU corresponding to a second timer, and the act S320 may include: before the data duplication and transmission function of the second RLC entity is in an off state, if the second RLC SDU has generated a second RLC PDU, the terminal device transmits the second RLC PDU to the network device or discards the second RLC PDU.

Before the data duplication and transmission function of the second RLC entity is closed, if the second RLC SDU in the second RLC buffer has generated the second RLC PDU, the terminal device may choose to send the second RLC PDU to the network device or may choose to discard the second RLC PDU.

In a specific implementation, the terminal device transmits the second RLC PDU to the network device or discards the second RLC PDU, including: in a case that the network device has successfully received duplicated data of the second RLC SDU in the first RLC buffer, the terminal device discards the second RLC PDU; or in a case that the network device does not successfully receive duplicated data of the second RLC SDU in the first RLC buffer, the terminal device transmits the second RLC PDU to the network device.

Specifically, if the terminal device transmits duplicated data through the first RLC entity and the second RLC entity before the data duplication and transmission function of the second RLC entity is stopped, that is, the first RLC entity and the second RLC entity transmit the same data. In this case, if the second RLC SDU in the second RLC buffer has generated the second RLC PDU before the data duplication and transmission function of the second RLC entity is stopped, the terminal device may determine whether to transmit the second RLC PDU to the network device according to a transmission situation of the duplicated data of the second RLC SDU, that is, whether the duplicated data of the second RLC SDU in the first RLC buffer is successfully transmitted. For example, the terminal device may discard the second RLC PDU in a case that the network device has successfully received the duplicated data of the second RLC SDU in the first RLC buffer, that is, the duplicated data of the second RLC SDU is successfully transmitted, thereby avoiding waste of resources caused by repeated transmission of the second RLC PDU. Or, in a case that the network device fails to receive the duplicated data of the second RLC SDU in the first RLC buffer, that is, the duplicated data of the second RLC SDU fails to be transmitted, the second RLC PDU is transmitted to the network device, thereby ensuring the reliability of data transmission.

It should be noted that the implementation of the present disclosure is only introduced by taking the terminal device including the first RLC entity and the second RLC entity as an example, and should not constitute any limitation to the implementation of the present disclosure. The terminal device may also include more RLC entities, for example, a third RLC entity or a fourth RLC entity. When more RLC entities are included, an RLC SDU in each RLC entity may also be processed through the method for processing data provided in the implementation of the present disclosure, which is not repeated here.

The method for processing data according to the implementation of the present disclosure has been described in detail above. An apparatus for processing data according to an implementation of the present disclosure will be described below with reference to FIGS. 4 to 5. Technical features described in the method implementations are applicable to the following apparatus implementations.

Figure 4:
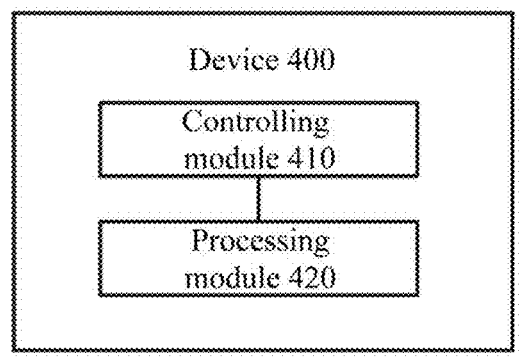
FIG. 4 shows a schematic block diagram of a device for processing data according to an implementation of the present disclosure.

FIG. 4 shows a schematic block diagram of a device 400 for processing data according to an implementation of the present disclosure. As shown in FIG. 4, the device 400 includes a controlling module 410 and a processing module 420.

The controlling module 410 is used for controlling a current state of data duplication and transmission function according to first indication information, wherein the first indication information is used for indicating whether the data duplication and transmission function is enabled.

The processing module 420 is used for processing each RLC service data unit (SDU) in a first radio link control (RLC) buffer and a second RLC buffer according to the current state of the data duplication and transmission function, wherein the first RLC buffer corresponds to a first RLC entity and the second RLC buffer corresponds to a second RLC entity.

Optionally, in some implementations, the processing module 420 is used for: controlling a state of a timer corresponding to each RLC SDU in the first RLC buffer and the second RLC buffer according to the current state of the data duplication and transmission function, wherein the timer corresponding to the each RLC SDU is used for controlling time that each RLC SDU occupies an RLC buffer; and processing the each RLC SDU according to the state of the timer corresponding to the each RLC SDU.

Optionally, in some implementations, the timer corresponding to the each RLC SDU has the same time length.

Optionally, in some implementations, timers corresponding to at least two RLC SDUs have different time lengths.

Optionally, in some implementations, the processing module 420 is further used for: if the data duplication and transmission function is in an on state, starting the timer corresponding to the each RLC SDU in the first RLC buffer and the second RLC buffer; or if the data duplication and transmission function is in an off state, stopping the timer corresponding to the each RLC SDU in the first RLC buffer and the second RLC buffer, or stopping a timer corresponding to each RLC SDU in the second RLC buffer, and keeping on a timer corresponding to each RLC SDU in the first RLC buffer.

Optionally, in some implementations, the first RLC buffer includes a first RLC SDU corresponding to a first timer, and the processing module 420 is further used for: before the first timer expires, submitting a first RLC PDU to a media access control (MAC) entity if the first RLC SDU has generated the first RLC PDU; or in a case that the first timer expires, discarding the first RLC SDU if the first RLC SDU does not generate the first RLC PDU.

Optionally, in some implementations, the processing module 420 is further used for: in a case that the first timer expires, resetting the first timer if the first RLC SDU does not generate the first RLC PDU; or before the first timer expires, stopping the first timer if the first RLC SDU has generated the first RLC PDU.

Optionally, in some implementations, the processing module 420 is further used for: in a case that the data duplication and transmission function of the second RLC entity is in an off state, discarding each RLC SDU in the second RLC buffer.

Optionally, in some implementations, the second RLC buffer includes a second RLC SDU corresponding to a second timer, and the processing module 420 is further used for: before data duplication and transmission function of the second RLC entity is in an off state, if the second RLC SDU has generated a second RLC PDU, transmitting the second RLC PDU to a network device or discarding the second RLC PDU.

Optionally, in some implementations, the processing module 420 is specifically used for: discarding the second RLC PDU in a case that the network device has successfully received duplicated data of the second RLC SDU in the first RLC buffer; or transmitting the second RLC PDU to the network device if the network device does not successfully receive duplicated data of the second RLC SDU in the first RLC buffer.

Optionally, in some implementations, the controlling module 410 is specifically used for: controlling to start the data duplication and transmission function if the first indication information indicates enabling the data duplication and transmission function; or controlling to close the data duplication and transmission function if the first indication information indicates disabling data duplication and transmission function.

Optionally, in some implementations, the device 400 further includes a communicating module.

The communicating module is used for receiving a MAC control element (CE) sent by the network device, wherein the MAC CE includes the first indication information.

Optionally, in some implementations, the first indication information is specifically used for indicating stopping the data duplication and transmission function of the second RLC entity.

Optionally, in some implementations, the device 400 further includes a submitting module.

The submitting module is used for duplicating a PDCP packet data unit (PDU) to be transmitted into two units in a case that the data duplication and transmission function is in an on state, and submitting the two units to the first RLC entity and the second RLC entity respectively; or in a case that the data duplication and transmission function is in an off state, submitting the PDCP PDU to be transmitted to the first RLC entity; or in a case that the data duplication and transmission function is in an off state, submitting a first PDCP PDU to be transmitted to the first RLC entity, and submitting a second PDCP PDU to be transmitted to the second RLC entity, wherein the first PDCP PDU and the second PDCP PDU are different.

It should be understood that the device 400 for processing data according to the implementation of the present disclosure may correspond to the terminal device in the method implementations of the present disclosure, and the above-mentioned and other operations and/or functions of various units in the device 400 are respectively for realizing the corresponding processes of the terminal device in the method shown in FIG. 3, and will not be repeated here for the sake of brevity.

Figure 5:
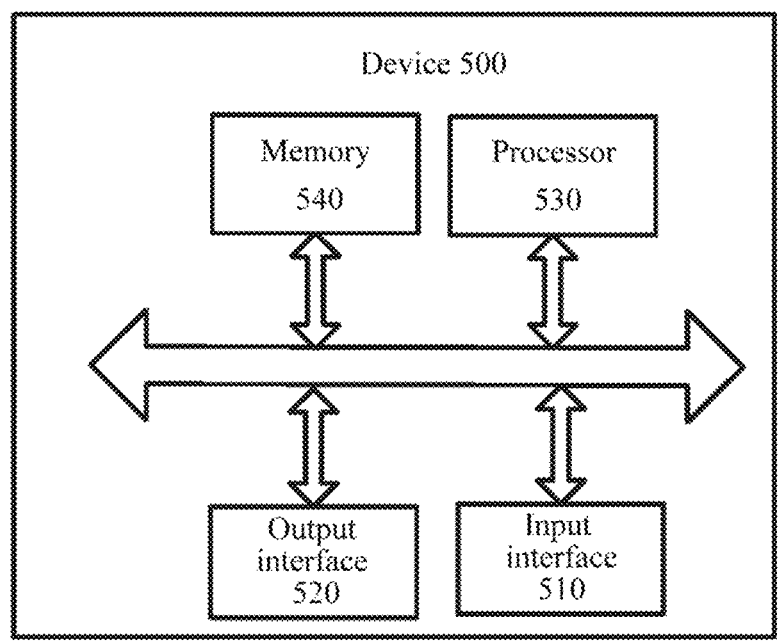
FIG. 5 shows a schematic block diagram of a device for processing data according to another implementation of the present disclosure.

As shown in FIG. 5, an implementation of the present disclosure also provides a device 500 for processing data, which may be the device 400 in FIG. 4 and may be used for executing the operations of the terminal device corresponding to the method 300 in FIG. 3. The device 500 includes an input interface 510, an output interface 520, a processor 530, and a memory 540. The input interface 510, the output interface 520, the processor 530, and the memory 540 may be connected through a bus system. The memory 540 is used for storing programs, instructions, or codes. The processor 530 is used for executing the programs, instructions, or codes in the memory 540 to control the input interface 510 to receive signals, to control the output interface 520 to send signals, and to complete the operations in the foregoing method implementations.

It should be understood that in the implementation of the present disclosure, the processor 530 may be a Central Processing Unit (CPU), or the processor 530 may be other general purpose processors, digital signal processors (DSP), dedicated integrated circuits (ASIC), Field programmable gate arrays (FPGA) or other programmable logic devices, discrete gate or transistor logic devices, discrete hardware components, etc. The general purpose processor may be a microprocessor or the processor may be any conventional processor or the like.

The memory 540 may include a read only memory and a random access memory, and provide instructions and data to the processor 530. A portion of memory 540 may include non-transitory random access memory. For example, the memory 540 may also store type information of a device.

In implementation processes, various acts of the methods described above may be accomplished by integrated logic circuits of hardware or instructions in the form of software in the processor 530. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 540, and the processor 530 reads the information in the memory 540, and accomplishes the contents of the above method in combination with its hardware. In order to avoid repetition, it will not be described in detail here.

In a specific implementation, the controlling module 410 and the processing module 420 in the device 400 may be implemented by the processor 530 in FIG. 5, and the communicating module and the submitting module of the device 400 may be implemented by the input interface 510 and the output interface 520 in FIG. 5.

In implementation processes, various acts of the methods described above may be accomplished by integrated logic circuits of hardware or instructions in the form of software in the processor 530. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 540, and the processor 530 reads the information in the memory 540, and accomplishes the contents of the above method in combination with its hardware. In order to avoid repetition, it will not be described in detail here.

The implementations of the present disclosure also provide a computer readable storage medium that stores one or more programs including instructions that, when executed by a portable electronic device including a plurality of application programs, enable the portable electronic device to perform the method of the implementations shown in FIG. 3.

The implementations of the present disclosure also provide a computer program, which includes instructions that, when executed by a computer, enable the computer to execute the corresponding processes of the method of the implementations shown in FIG. 3.

The term "and/or" in this document is merely an association relationship describing associated objects, indicating that there may be three relationships, for example, A and/or B may indicate three situations: A alone, A and B, and B alone. In addition, the symbol "/" in this document generally indicates that objects before and after the symbol "/" have an "or" relationship.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed system, apparatus and method may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of various implementations of the present disclosure. The aforementioned storage medium includes various media capable of storing program codes, such as a U disk, a mobile hard disk, a read-only memory (ROM), a random access memory (RAM), a magnetic disk, or an optical disk.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure shall be the protection scope defined by the claims.

What is claimed is:

1. A method for processing data, comprising:
controlling, by a terminal device, a current state of data duplication and transmission function according to first indication information, wherein the first indication information is used for indicating whether the data duplication and transmission function is enabled;
processing, by the terminal device, each RLC service data unit (SDU) in a first radio link control (RLC) buffer and a second RLC buffer according to the current state of the data duplication and transmission function, wherein the first RLC buffer corresponds to a first RLC entity and the second RLC buffer corresponds to a second RLC entity; and
receiving, by the terminal device, a MAC control element (CE) sent by a network device, wherein the MAC CE comprises the first indication information,
wherein the processing, by the terminal device, the each RLC service data unit (SDU) in the first radio link control (RLC) buffer and the second RLC buffer according to the current state of the data duplication and transmission function, comprises:
in a case that the data duplication and transmission function of the second RLC entity is in an off state, discarding all RLC SDUs in the second RLC buffer,
wherein the controlling, by the terminal device, the current state of the data duplication and transmission function according to the first indication information, comprises:
controlling, by the terminal device, to start the data duplication and transmission function if the first indication information indicates enabling the data duplication and transmission function; or controlling, by the terminal device, to close the data duplication and transmission function if the first indication information indicates disabling the data duplication and transmission function.

2. The method according to claim 1, wherein the second RLC buffer comprises a second RLC SDU, the second RLC SDU corresponds to a second timer, and the processing, by the terminal device, the each RLC service data unit (SDU) in the first radio link control (RLC) buffer and the second RLC buffer according to the current state of the data duplication and transmission function, comprises:

before the data duplication and transmission function of the second RLC entity is in an off state, transmitting, by the terminal device, a second RLC PDU to a network device or discarding the second RLC PDU if the second RLC SDU has generated the second RLC PDU.

3. The method according to claim 2, wherein the transmitting, by the terminal device, the second RLC PDU to the network device or discarding the second RLC PDU, comprises:

in a case that the network device has successfully received duplicated data of the second RLC SDU in the first RLC buffer, discarding, by the terminal device, the second RLC PDU; or in a case that the network device does not successfully receive duplicated data of the second RLC SDU in the first RLC buffer, transmitting, by the terminal device, the second RLC PDU to the network device.

4. The method according to claim 1, wherein the method further comprises:

if the data duplication and transmission function is in an on state, duplicating, by a packet data convergence protocol (PDCP) entity of the terminal device, a PDCP packet data unit (PDU) to be transmitted into two units and submitting the two units to the first RLC entity and the second RLC entity respectively; or submitting, by the PDCP entity of the terminal device, the PDCP PDU to be transmitted to the first RLC entity if the data duplication and transmission function is in an off state; or submitting, by the PDCP entity of the terminal device, a first PDCP PDU to be transmitted to the first RLC entity and submitting a second PDCP PDU to be transmitted to the second RLC entity if the data duplication and transmission function is in an off state, wherein the first PDCP PDU and the second PDCP PDU are different.

5. A device for processing data, comprising a processor and an input interface, wherein, the processor is configured to control a current state of data duplication and transmission function according to first indication information, wherein the first indication information is used for indicating whether the data duplication and transmission function is enabled; and the processor is further configured to process each RLC service data unit (SDU) in a first radio link control (RLC) buffer and a second RLC buffer according to the current state of the data duplication and transmission function, wherein the first RLC buffer corresponds to a first RLC entity and the second RLC buffer corresponds to a second RLC entity;

the processor is further configured to, in a case that the data duplication and transmission function of the second RLC entity is in an off state, discard all RLC SDUs in the second RLC buffer;

the processor is further configured to control to start the data duplication and transmission function if the first indication information indicates enabling the data duplication and transmission function or control to close the data duplication and transmission function if the first indication information indicates disabling data duplication and transmission function; and the input interface is configured to receive a MAC control element (CE) sent by a network device, wherein the MAC CE comprises the first indication information.

6. The device according to claim 5, wherein the second RLC buffer comprises a second RLC SDU, the second RLC SDU corresponds to a second timer, and the processor is further configured to:

before data duplication and transmission function of the second RLC entity is in an off state, if the second RLC SDU has generated a second RLC PDU, transmit the second RLC PDU to a network device or discard the second RLC PDU.

7. The device according to claim 6, wherein the processor is specifically configured to:

discard the second RLC PDU in a case that the network device has successfully received duplicated data of the second RLC SDU in the first RLC buffer; or transmit the second RLC PDU to the network device if the network device does not successfully receive duplicated data of the second RLC SDU in the first RLC buffer.

8. The device according to claim 5, wherein the device further comprises:

an output interface, configured to duplicate a PDCP packet data unit (PDU) to be transmitted into two units in a case that the data duplication and transmission function is in an on state, and submit the two units to the first RLC entity and the second RLC entity respectively; or in a case that the data duplication and transmission function is in an off state, submit the PDCP PDU to be transmitted to the first RLC entity; or in a case that the data duplication and transmission function is in an off state, submit a first PDCP PDU to be transmitted to the first RLC entity, and submit a second PDCP PDU to be transmitted to the second RLC entity, wherein the first PDCP PDU and the second PDCP PDU are different.

* * * * *